(12) United States Patent
Mohania et al.

(10) Patent No.: US 8,862,609 B2
(45) Date of Patent: Oct. 14, 2014

(54) EXPANDING HIGH LEVEL QUERIES

(71) Applicant: International Business Machines Corporation, Armonk, NY (US)

(72) Inventors: Mukesh K. Mohania, Agra (IN); Raja Sreekanth Nidadavolu, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 13/630,534

(22) Filed: Sep. 28, 2012

(65) Prior Publication Data

US 2014/0095527 A1  Apr. 3, 2014

(51) Int. Cl.
G06F 17/30 (2006.01)
(52) U.S. Cl.
USPC ........................................... 707/766
(58) Field of Classification Search
CPC ................................ G06F 17/30132
USPC ................... 707/2, 3, 748, 766; 709/204–206
See application file for complete search history.

(56) References Cited

U.S. PATENT DOCUMENTS

| | | | |
|---|---|---|---|
| 5,555,408 A | 9/1996 | Fujisawa et al. | |
| 6,026,388 A | 2/2000 | Liddy et al. | |
| 6,484,162 B1 | 11/2002 | Edlund et al. | |
| 6,546,381 B1 | 4/2003 | Subramanian et al. | |
| 7,536,382 B2 | 5/2009 | Zhou et al. | |
| 7,643,822 B2 | 1/2010 | Ling et al. | |
| 7,720,867 B2 | 5/2010 | Subramanian et al. | |
| 8,065,316 B1 | 11/2011 | Baker et al. | |
| 8,095,533 B1 | 1/2012 | Ponte | |
| 8,103,653 B2 | 1/2012 | Newbold et al. | |
| 8,402,032 B1 * | 3/2013 | Brunsman et al. | 707/748 |
| 2007/0239671 A1 | 10/2007 | Whitman et al. | |
| 2008/0244429 A1 * | 10/2008 | Stading | 715/764 |
| 2010/0306228 A1 | 12/2010 | Carpenter et al. | |
| 2011/0078166 A1 | 3/2011 | Oliver et al. | |
| 2011/0087686 A1 | 4/2011 | Brewer et al. | |

OTHER PUBLICATIONS

SAP AG, "What's New in BusinessObjects XI 3.1 Service Pack 2" [online]. Copyright 2009 SAP AG, Feb. 15, 2010, [retrieved on Jan. 11, 2012]. Retrieved from the internet:<URL: http://help.sap.com/businessobject/product_guides/boexir31sp2/en/xi31_sp2_whats_new_en.pdf>.

* cited by examiner

*Primary Examiner* — Etienne Leroux
(74) *Attorney, Agent, or Firm* — Isaac J. Gooshaw

(57) ABSTRACT

A received query is modified by identifying one or more words or phrases in the query that have known associations with stored data upon which the query can be executed, determining whether each of the one or more words or phrases is associated with an attribute name corresponding to stored data, determining whether each of the one or more words or phrases is associated with any constraints regarding an attribute name, determining whether each of the one or more words or phrases is associated with a rule regarding structure or syntax of the query, substituting any determined attribute names into the query for each of the respective associated one or more words or phrases, adding any determined constraints to the query limiting a determined attribute name, and applying any determined rules associated with the one or more words or phrases.

25 Claims, 4 Drawing Sheets

EXPANDING HIGH LEVEL QUERIES

FIELD OF THE INVENTION

The present invention relates generally to the field of data management and more particularly to manipulating user queries into queries that can be processed and understood by a data processing system.

BACKGROUND OF THE INVENTION

Many businesses and organizations store large amounts of data for recording purposes and analytics. In fact, a whole field has developed for computer-based techniques for identifying, extracting, and analyzing business data (e.g., associated costs and incomes, sales revenue by products, etc.). On a basic level, a query can be written and executed to retrieve desired information from various types of data repositories. The query must conform to a strict set of rules regarding form and syntax, which are dictated by a query language used to express queries into databases and information systems. It is not uncommon for individuals that desire the information (for example, a sales person, a client, upper management, etc.) to be unfamiliar with the query language. Often, the request for information is relayed to someone knowledgeable in the query language (e.g., an IT worker), who may then submit a formal query on a requester's behalf. Another common solution is to create one or more reports which can query a plurality of data sources and compile results to present business data in a human readable form. Such a report can be run at any time to retrieve current data without having to rewrite queries.

SUMMARY

In one embodiment of the present invention a method is provided for modifying a query. The method includes identifying one or more words or phrases in the query that have known associations with stored data upon which the query can be executed, determining, by operation of one or more computer processors, whether each of the one or more words or phrases is associated with an attribute name corresponding to stored data, determining, by operation of one or more computer processors, whether each of the one or more words or phrases is associated with any constraints regarding an attribute name, determining, by operation of one or more computer processors, whether each of the one or more words or phrases is associated with a rule regarding structure or syntax of the query, substituting any determined attribute names into the query for each of the respective associated one or more words or phrases, adding any determined constraints to the query limiting a determined attribute name, and applying any determined rules associated with the one or more words or phrases.

In other embodiments of the invention, a computer program product and a system embodying the invention are provided.

DETAILED DESCRIPTION

Figure 1:
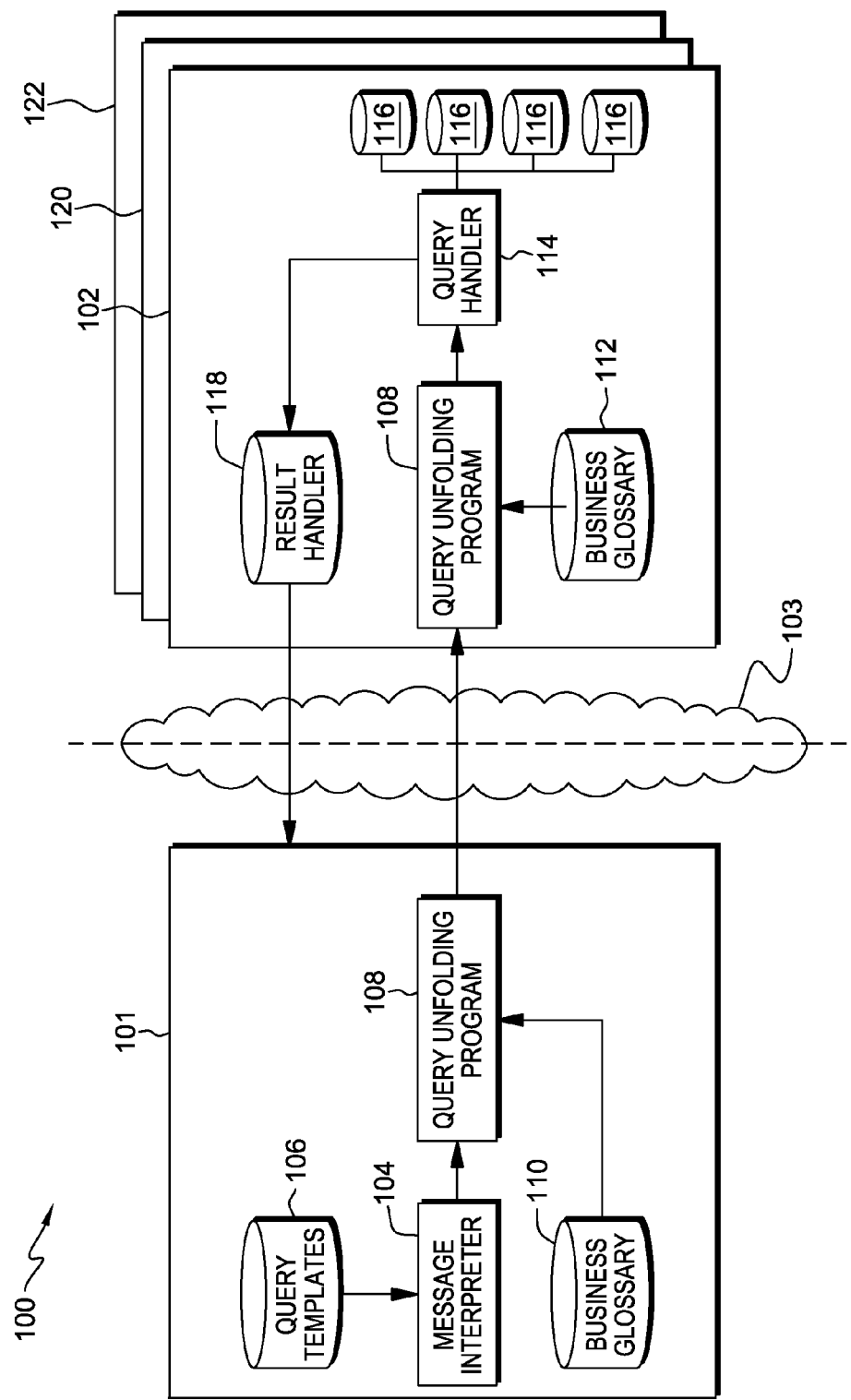
FIG. 1 illustrates a distributed data processing system, including a computing device and a server computer, according to one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 illustrates a distributed data processing system, generally designated 100, according to one embodiment of the present invention.

In the illustrated embodiment, distributed data processing system 100 comprises computing device 101 and server computers 102, 120, and 122 interconnected through network 103. Computing device 101 may be any electronic device or computing system capable of receiving input from a user, executing program instructions, and communicating with another computer through a network. In a preferred embodiment, computing device 101 is a mobile computing device, such as a personal digital assistant or smart phone, and is wirelessly connected to network 103 by Wi-Fi or cellular technology.

Computing device 101 includes message interpreter 104 and query unfolding program 108. Embodiments of the present invention recognize that using a third party to interpret a request and write a syntactically correct query can increase cost and decrease efficiency. Embodiments of the present invention further recognize that a report can be quite comprehensive, and running a full report for one small piece of information is often inefficient. Additionally, a report may not exist that returns the desired information or an individual may simply not have access to such reports. As such, embodiments of the present invention provide a method, program product, and system for composing or receiving a user or high level query or request for data in an improper form and, utilizing stored query templates and known terms, converting (unfolding) the user query into a query understandable by a computer system. Towards that end, computing device 101 may execute message interpreter 104, which is a routine or program that takes the user query and fits it to the nearest query template from a list of known query templates 106. The query, now in a template format, is passed to query unfolding program 108 which examines all terms that are not predefined from the template and determines whether these are known terms, for example by comparing them to terms in business glossary 110. Business glossary 110 may associate each known term to one or more business definitions (including attribute names of stored data), business rules (e.g., constraints limiting sought attributes, rules of structure and syntax for a query, etc.), and locations (e.g., proper databases, servers, etc.). Appropriate rules, definitions, and/or locations may be substituted and/or added into the query for the associated term. The unfolded query is subsequently submitted to the appropriate server computer as determined by determined location information, here depicted as server computer 102.

Server computer 102 may be, for example, a server computer system such as a management server, a web server, or any other electronic device or computing system capable of receiving and sending data and executing program instructions. Alternatively, server computer 102 may represent a computing system utilizing clustered computers and components to act as a single pool of seamless resources when accessed through network 103. This is a common implementation for data centers and cloud computing applications.

In one embodiment, the unfolded query received by server computer 102, is now in an understandable format for the server computer, and the server computer merely processes the query and returns results. However, embodiments of the present invention recognize that storage capacity and other resources on computing device 101 may be limited, especially when compared to the resources on server computer 102. As such, in a preferred embodiment, the unfolded query received by server computer 102, though in a format that is nearer to a syntactically correct query, is further unfolded or expanded on server computer 102. In the depicted example, a second instance of query unfolding program 108 operates on server computer 102, using a local, and perhaps more comprehensive, business glossary 112. Again appropriate associations discovered in the business glossary are substituted into the query. The resulting query can now be executed, and is passed to query handler 114, which is a routine or program that processes queries, to identify target repositories, databases, etc. (e.g., storage locations 116) and perform the query. The results may be processed by result handler 118, which may send the results to computing device 101, or alternatively, may forward the results to an interested third party (e.g., a client requesting the data).

A person of ordinary skill in the art will recognize that in alternate embodiments, the determined location information on computing device 101 may indicate that the unfolded query should be sent to multiple server computers, e.g., server computers 102, 120, and 122. Similarly, based on the involved data storage details, the initial high level query or request may be split into multiple queries and submitted to different servers for processing. Results received from result handler 118 on server computer 102 and corresponding result handler functionalities on server computers 120 and 122 would be compiled and presented to a user by a result handling functionality (not depicted) on computing device 101.

Network 103 may include connections, such as wire, wireless communication links, or fiber optic cables. In the depicted example, network 103 is the Internet representing a worldwide collection of networks and gateways that use the Transmission Control Protocol/Internet Protocol suite of protocols to communicate with one another. Network 103 may also be implemented as a number of different types of networks, such as an intranet, a local area network (LAN), or a wide area network (WAN).

Figure 4:
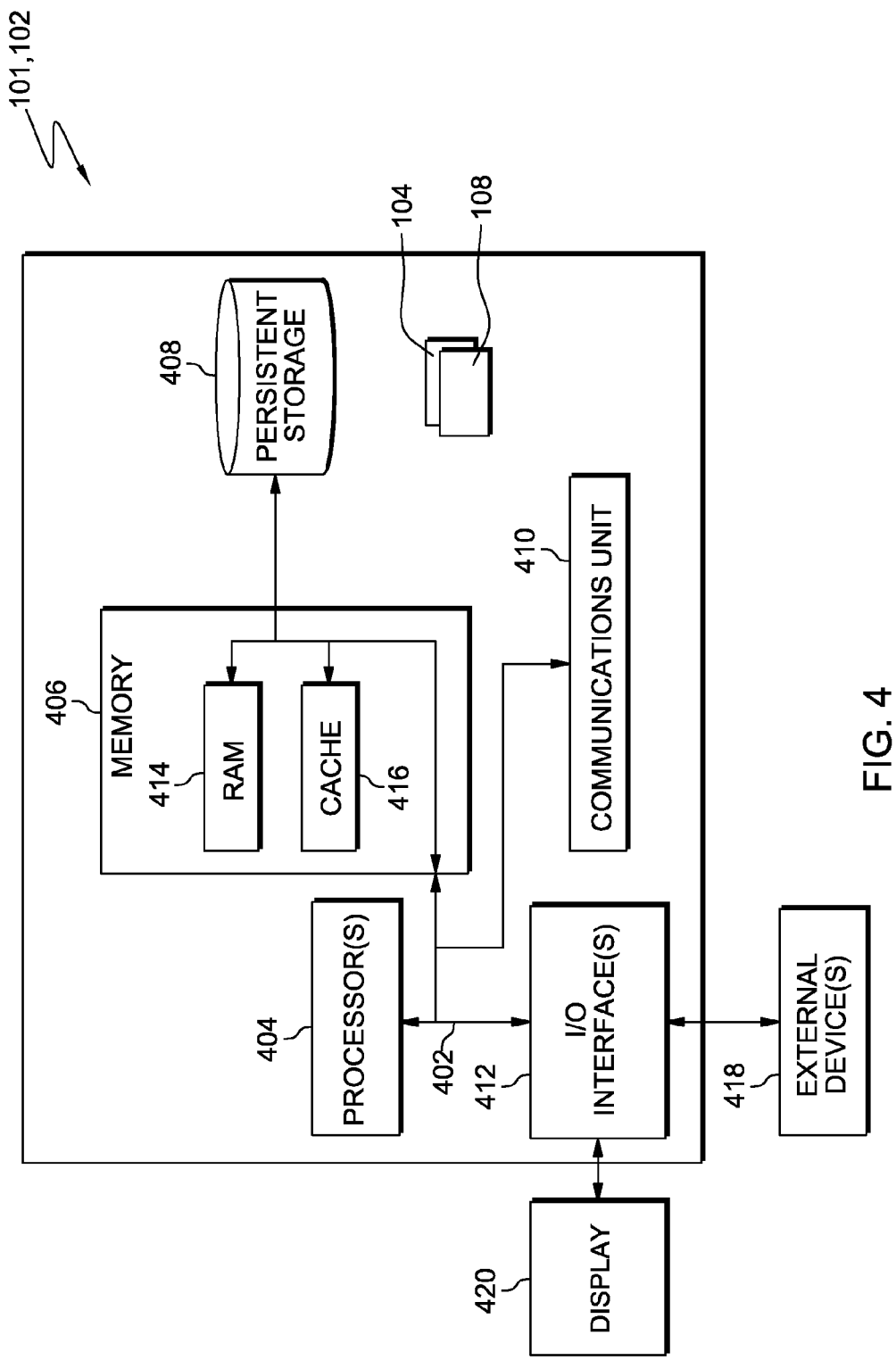
FIG. 4 depicts a block diagram of components of a computing device, such as the computing device or server computer depicted in FIG. 1, in accordance with an illustrative embodiment.

Computing device 101 and server computer 102 each maintain respective system components. Exemplary components for these systems are illustrated in FIG. 4.

Figure 2:
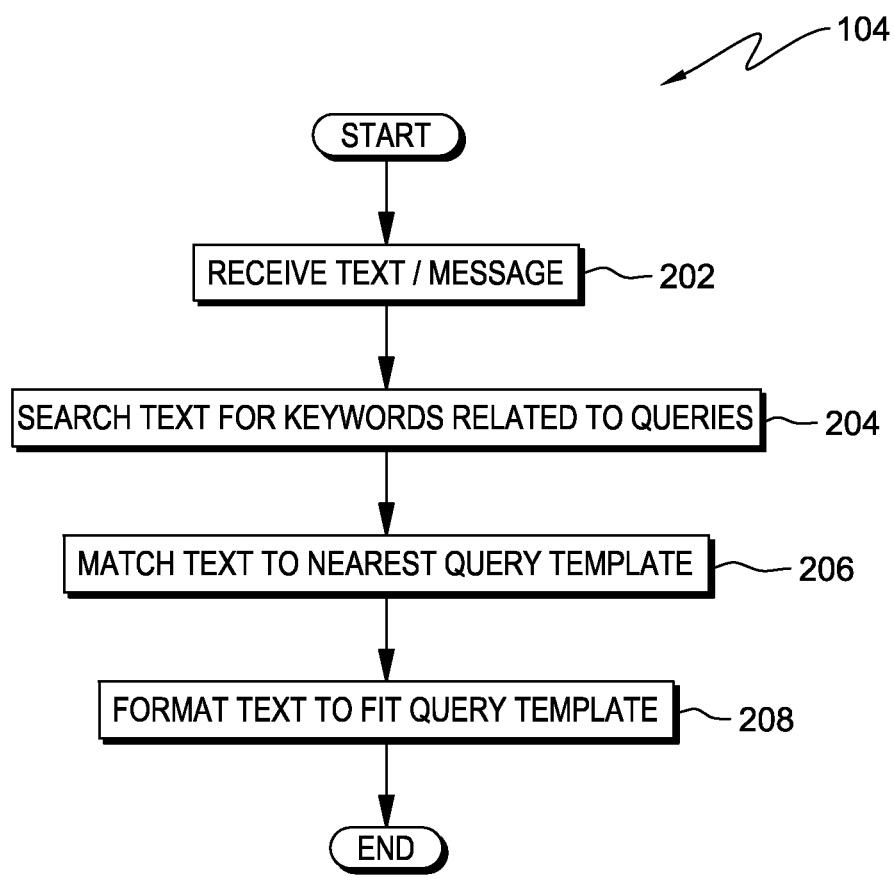
FIG. 2 depicts the operational steps of a message interpreter program for fitting a user query to a known query template.

FIG. 2 is a flowchart depicting the operational steps of message interpreter 104 for fitting a natural language query to a known query template.

Message interpreter 104 begins by receiving text or a message intended as a query (step 202). In one embodiment, message interpreter 104 may receive the text directly from a user of computing device 101. In another embodiment, computing device 101 may receive a message from a third party and direct the message to message interpreter 104. For example, the user of computing device 101 may have a client that requests information related to the user's business. Where computing device 101 is a smart phone, the client request may come in the form of a text message, a voice message, or even during a phone conversation. A text message can be sent directly to message interpreter 104. Alternatively, a voice message or recorded conversation can be converted to text using known speech recognition programs, and the converted text can be sent to message interpreter 104.

Subsequent to receiving pertinent text, message interpreter 104 searches the text for key words related to queries (step 204). As a threshold matter, in one embodiment, message interpreter 104 determines whether the received text or message is meant to be a query at all. In one exemplary implementation, the text of a message is searched for key words indicative of a query (e.g., "provide," "please provide," "I need," "send me," etc.). If it is determined that the text is a query, message interpreter 104 may search for words and/or phrases within the text that match words and/or phrases (or their equivalents) found in a list of query templates. For example, one query template might read: "select <attribute> from <location>*where <constraints>*and <constraints>*and <constraints>." The "*" represents optional components of the query that may be filled. A more basic template might look like: "provide <attribute> of <attribute> in <attribute>." A series of such templates may exist and each of the key words (query words) and their equivalents may be searched for. A query word like "select" may have a list of equivalent words such as "provide," "get," "send," etc. "From" might have the equivalent "of." "In" might have defined equivalents "between," "within," "from <date> to <date>," etc. In one embodiment, a "<constraint>" marker might be associated with query words that indicate that the constraint should be replaced by the word/phrase that follows the word. For example, "where" might be a query word defined as a known constraint limitation. If "where" is found in text, the word or phrase following "where" may be substituted into a <constraint> placeholder. Similarly, "in" might indicate that the subsequent term should be substituted into a <constraint> placeholder. Query templates may be predefined in the system or may be created by a user of the system to match the specific requirements of the user's organization.

Message interpreter 104 matches the text to the nearest query template from the list of query templates (step 206) and formats the text to fit the query template (step 208). For example, terms can be replaced with equivalent terms from the query template and clauses may be rearranged to follow a specific order. Take for example, the text "provide top 3 high value customers of abc_bank in first quarter." The nearest query template may be "select <attribute> from <location>*where <constraints>*and <constraints>*and <constraint>". Subsequent to fitting the query to the query template, the query reads: "select top 3 high value customers from abc bank *where <constraints>*and <constraints> and in first quarter" (with "in first quarter" replacing one of the optional <constraints>).

The query, now formed to the nearest template, may be forwarded to query unfolding program 108. In another embodiment, to form the initial user query, when the user is composing the query, the user may be presented with a plurality of query templates from which he can compose the query. In such a manner, the user query is already formed to a query template and may be forwarded to query unfolding program 108.

Figure 3:
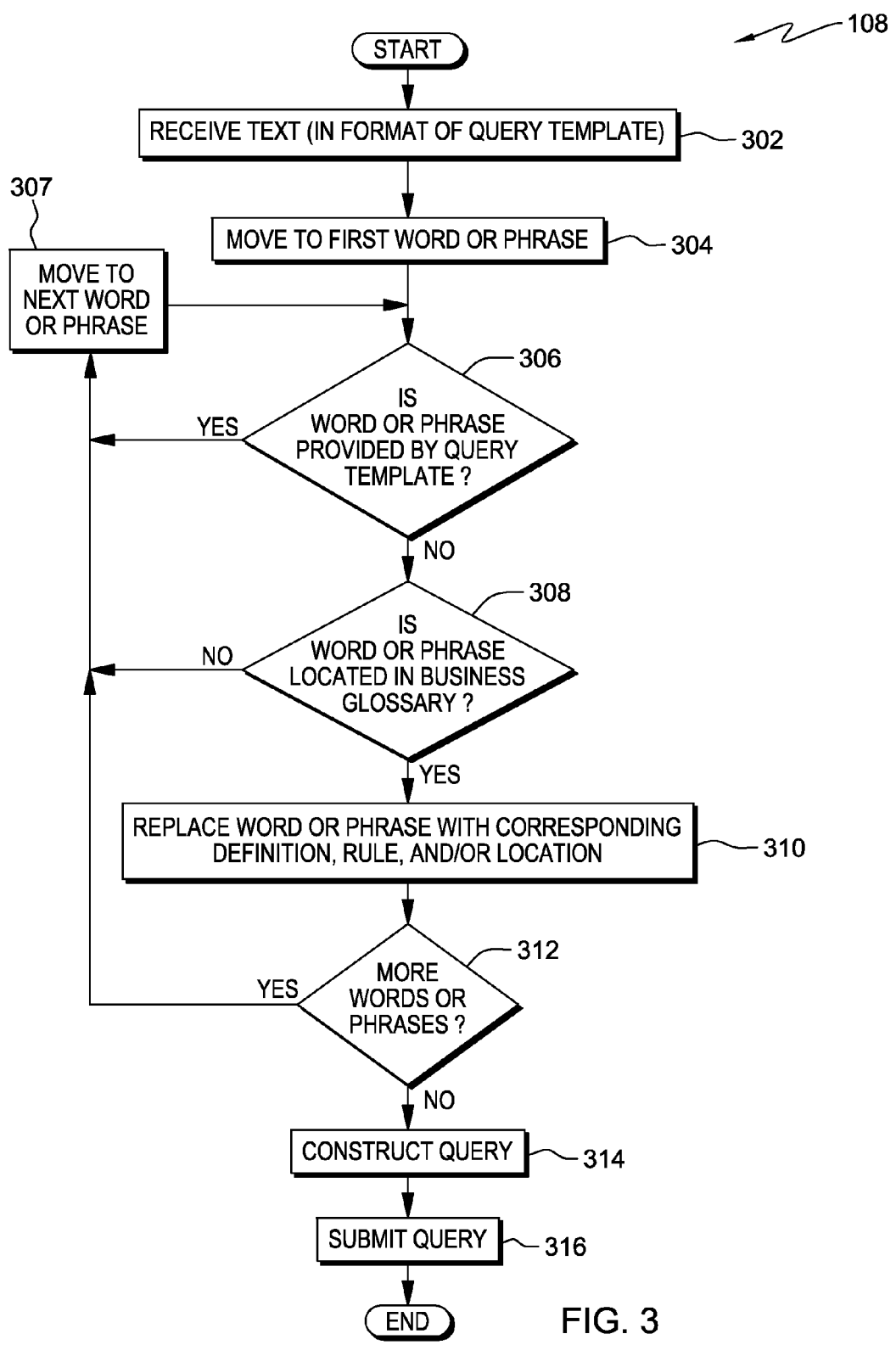
FIG. 3 depicts the operational steps of a query unfolding program for building into the query accurate terms, constraints, and locations, in accordance with an illustrative embodiment.

FIG. 3 depicts the operational steps of query unfolding program 108 for building into the query accurate terms, constraints, and locations, in accordance with an illustrative embodiment.

In an exemplary embodiment, query unfolding program 108 receives the text/query in the format of a query template (step 302). Query unfolding program 108 moves to and examines the first word or phrase of the query (step 304) and determines whether the word or phrase is provided by, or part of, the original query template (decision 306). For example, the words "select," "get," "move," "from," etc. may be terms specific to a query template with predefined actions or associations already defined for such terms. If the word is provided by the template (yes branch of decision 306), query unfolding program 108 skips the word or phrase and moves to the next word or phrase (step 307). If the word or phrase is not a predefined term from a query template (no branch of decision 306), query unfolding program 108 determines whether the word or phrase is located in the business glossary, e.g., business glossary 110 or business glossary 112 (decision 308).

The business glossary contains known business terms and corresponding definitions, rules, and/or locations. For example, the business glossary can store business vocabulary and associations. Within the business glossary, categories and terms can be defined, as well as custom attributes and values. A person of ordinary skill in the art will understand that while in one embodiment all vocabulary and associations may be stored in a single database or repository, in other embodiments, terms may be linked to appropriate associations in other databases.

In an exemplary embodiment, the business glossary connects business glossary terms to individual instances of metadata called "information assets," or "assets." An information asset is a piece of information that is of value to an organization and can have relationships, dependencies, or both with other information assets. One example of an asset is an implemented data resource such as a database table. Hence, a term in the business glossary may be linked to a specific attribute value found in a specific database table. In this manner, business terms found in the business glossary can indicate attribute names and locations, constraints (e.g., filters and other limiting clauses), organizational rules, and other pertinent information and definitions.

In one embodiment, the business glossary organizes metadata or information assets into categories corresponding to specific terms. The corresponding terms can relate to the assets that are stored in a metadata repository or to external assets according to the standards and practices of an enterprise. Words or phrases captured by query unfolding program 108 can be searched for in the business glossary for information such as a category corresponding to the term, context, status, abbreviations, related terms, synonyms, assigned assets, and other attributes.

If query unfolding program 108 does not locate the word or phrase in the business glossary (no branch of decision 308), query unfolding program 108 moves to the next word or phrase (step 307). Alternatively, if query unfolding program does locate the word or phrase in the business glossary (yes branch of decision 308), query unfolding program 108 replaces the word or phrase with any applicable corresponding definition, rule, and/or location (step 310). Query unfolding program 108 may add in additional constraints or reorganize the query based on discovered rules. In some embodiments, different rules may apply depending on the query template used.

Query unfolding program 108 determines whether there are more words or phrases (decision 312) and if there are, moves to the next word or phrase (step 307). If there are no more words or phrases, query unfolding program 108 finishes constructing the query (step 314), for example, by completing any remaining reorganization required by business rules or removing any unfilled optional terms from the query, and submits the query (step 316). If query unfolding program 108 is an instance running on a client device such as computing device 101, the query is submitted to the applicable server computer (or computers) such as server computer 102. At server computer 102, if the query is complete, server computer 102 may run the query and submit the results. If the query is not complete, server computer 102 may run its own instance of query unfolding program 108 utilizing a different and/or larger business glossary, e.g., business glossary 112.

Take for example the first exemplary query from above: "provide top 3 high value customers of abc_bank in first quarter." The nearest query template was "select <attribute> from <location>*where <constraints>*and <constraints>*and <constraints>," which computing device 101 translated to "select top 3 high value customers from abc bank *where <constraints>*and <constraints>*and in first quarter." As depicted, the query words designated with a "*" are optional and may still be filled if subsequently discovered rules supply applicable terms. "Select" is a word from the query template and in this example is ignored. In another embodiment, all words and phrases are searched for in the business glossary including query words, which would either not be found or would be listed as a query verb and remain unchanged. Query unfolding program 108 on computing device 101 moves to the next word or phrase. For discussion purposes, query unfolding program 108 does not locate "top 3" and leaves it unchanged. Query unfolding program 108 locates the term "high value customer" in the business glossary in an attributes category with "high value customer" defined as a customer detail ("cust_details"). A business rule associated with the term specifies a constraint that a high value customer is one who has a balance of more than one hundred thousand dollars (balance_amount>100000). The corresponding terms are replaced with these values. The unfolding query now reads: "select top 3 cust_details from abc bank where balance_amount>100000*and <constraints> and in first quarter."

Moving to the next word, "from" is a query word and remains in place. Query unfolding program 108 locates the next word, "abc_bank," in the business glossary. A resource location asset for "abc_bank" is a database table defined as "cust_abc_bank_tbl," which is substituted for "abc_bank." This is governed by the associated definition or business rule in the business glossary. Query unfolding program 108 continues to check subsequent words and phrases. The optional constraint is ignored. The term "in first quarter" is found in a "dates" category with an associated definition/rule of "trans_date between 1-jan-2011 and 28-mar-2011." The definition may be substituted for the term "in first quarter." After all words and phrases have been checked and necessary replacements met, optional constraints are removed. The query now reads: "select top 3 cust_details from cust_abc_bank_tbl where balance_amount>100000 and trans_date between 1-jan-2011 and 28_mar_2011." The query may now be run or submitted to the server containing "cust_abc_bank_tbl" to be run.

In this example, the query is submitted to the applicable server (e.g., server computer 102) and is incomplete. The process is repeated on server computer 102 with each word and phrase examined for matches in a different business glossary. Though "cust_details" could, in one embodiment, be the name of a single searchable attribute in a database, in another embodiment, an attribute substituted in at a client device may be further broken down at the server computer. For example, "cust_details" might be further defined as "cust.name" and "cust.address" based on definitions at the server computer.

The phrase "top 3" may be matched to a phrase in the server's business glossary such as "top n." The business rules associated with the term "top n" may specify that the parameters should be a transaction amount (trans_amount) and that the query should be nested n times to fetch the higher transaction amounts. Based on the located definitions and rules, the final query could be: "select cust.name, cust.address from cust_abc_bnk_tbl as c1 where (select count(trans_amount) from cust_abc_bnk_tbl as c2 where c1.trans_amount>c2.trans_amount)>3 and balance_amount>100000 and trans_date between 1-jan-2011 and 28_mar_2011".

Though the process described above fits the query to the nearest query template prior to comparing terms to the business glossary, a person of ordinary skill in the art will recognize that in other embodiments the words or phrases may be searched for in the business glossary first. Unfolding and substituting correct terms and determining categories to which the terms belong may in some instances be helpful in matching the query to the closest query template. In another embodiment still, each word or phrase may be compared to both the query templates and the business glossary as the text is being parsed. In such an embodiment, the list of potential query templates may be reduced as each word or phrase is examined.

FIG. 4 depicts a block diagram of components of a computing system, such as computing device 101 or server computer 102 in accordance with an illustrative embodiment. It should be appreciated that FIG. 4 provides only an illustration of one implementation and does not imply any limitations with regard to the environment in which different embodiments may be implemented. Many modifications to the depicted environment may be made.

The computing system includes communications fabric 402, which provides communications between computer processor(s) 404, memory 406, persistent storage 408, communications unit 410, and input/output (I/O) interface(s) 412.

Memory 406 and persistent storage 408 are examples of computer-readable tangible storage devices and media. Memory 406 may be, for example, one or more random access memories (RAM) 414, cache memory 416, or any other suitable volatile or non-volatile storage device.

Message interpreter 104 and query unfolding program 108 on computing device 101, for example, may be stored in persistent storage 408 for execution by one or more of the respective computer processors 404 via one or more memories of memory 406. In the embodiment illustrated in FIG. 4, persistent storage 408 includes flash memory. Alternatively, or in addition to, persistent storage 408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 410, in these examples, provides for communications with other data processing systems or devices. In these examples, communications unit 410 includes one or more network interface cards. Communications unit 410 may provide communications through the use of either or both physical and wireless communications links. In another embodiment still, the computing system may be devoid of communications unit 410. Message interpreter 104 and query unfolding program 108 may be downloaded to persistent storage 408 through communications unit 410.

I/O interface(s) 412 allows for input and output of data with other devices that may be connected to the computing system. For example, I/O interface 412 may provide a connection to external devices 418 such as a keyboard, keypad, a touch screen, and/or some other suitable input device. I/O interface(s) may also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for generating a query by modifying a query template, the method comprising:

identifying, by operation of one or more computer processors, one or more words in a natural language query that have previously-established associations with stored data upon which the query will be executed, wherein identifying the one or more words in the natural language query further comprises:

receiving, by operation of one or more computer processors, the natural language query, the natural language query being formatted to a query template, wherein the query template includes at least one first component and at least one second component, the first component including a predefined action, the second component being modifiable based, at least in part, on the one or more words;

determining, by operation of one or more computer processors, at least one link between the one or more words in the natural language query and the at least one second component;

modifying, by operation of one or more computer processors, the at least one second component of the query template based, at least in part, on the at least one link, wherein modifying the at least one second component includes adding to the query template a rule that limits possible values for the at least one second component and a name of a database table that includes the stored data upon which the query will be executed;

generating a new query by adding one or more values to the query template, wherein the one or more values are added to the query template based, at least in part, on the modification of the at least one second component of the query template and the one or more words in the natural language query; and executing a search based on the new query.

2. The method of claim 1, further comprising:

prior to identifying the one or more words in the natural language query that have previously-established associations with stored data upon which the query will be executed:

providing a user a plurality of query templates; and receiving, from the user, the query formed to one of the plurality of query templates.

3. The method of claim 1, further comprising:

prior to identifying the one or more words in the natural language query that have previously-established associations with stored data upon which the query will be executed:

receiving the natural language query from a mobile computing device; and subsequent to executing the new query, returning results to the mobile computing device from which the natural language query was received.

4. The method of claim 1, wherein the at least one link between the one or more words in the natural language query and the at least one second component further comprises:

a relationship of the one or more words in the natural language query with at least one of a definition, a rule, and a location of the at least one second component, wherein:

the definition comprises an attribute in the query template that corresponds to stored data, and wherein a value for the attribute is associated with a database field of a database table;

the rule includes one or more constraints that limit possible values for the attribute in the query, and wherein the rule includes one or both of structure and syntax of the query template; and the location comprises a name of the database table that corresponds with stored data upon which the query will be executed.

5. The method of claim 1, wherein determining, by operation of one or more computer processors, at least one link between the one or more words in the natural language query and the at least one second component further comprises:
  locating the one or more words in the natural language query within a first glossary of terms, wherein the first glossary of terms comprises a list of the one or more words in the natural language query and the at least one link between the one or more words in the natural language query and the at least one second component; and
  responsive to locating the one or more words in the natural language query within the first glossary of terms, retrieving the at least one link between the one or more words in the natural language query and the at least one second component.

6. The method of claim 5, wherein generating a new query by adding one or more values to the query template further comprises:
  locating the added one or more values within a second glossary of terms;
  responsive to locating the added one or more values within the second glossary of terms, retrieving a second one or more values related to the added one or more values; and
  substituting the second one or more values into the query template for the modified at least one second component of the query template.

7. The method of claim 1, wherein modifying, by operation of one or more computer processors, the at least one second component of the query template further comprises:
  adding a determined name of an attribute into the at least one second component of the query template, wherein the name of the attribute that is added indicates a database field of a database table.

8. The method of claim 1, wherein determining, by operation of one or more computer processors, at least one link between the one or more words in the natural language query and the at least one second component further comprises:
  determining whether the one or more words in the natural language query is related to the at least one first component of the query template; and
  responsive to determining that the one or more words in the natural language query is not related to the at least one first component of the query template, determining whether the one or more words is related to the at least one second component of the query template.

9. The method of claim 1, further comprising:
  prior to identifying the one or more words in the natural language query that have previously-established associations with stored data upon which the query will be executed:
    receiving a portion of text from at least one selected from a group consisting of:
      one or more audio signals converted to text, a text message from a mobile device, and text input from a user;
    determining, by operation of one or more computer processors, whether the selection of text represents the natural language query;
    responsive to determining that the selection of text represents the natural language query, comparing the selection of text to a plurality of query templates;
    identifying, by operation of one or more computer processors, one or more words in the selection of text that is at least defined as equivalent to the one or more words corresponding to one or more of the query templates from the plurality of query templates;
    determining which query template corresponds to the highest number of matching or equivalent one or more words; and
    formatting the selection of text to the determined query template.

10. A computer program product for generating a query by modifying a query template, the computer program product comprising:
  one or more computer-readable tangible storage devices and program instructions, stored on the one or more computer-readable tangible storage devices, the program instructions comprising:
  program instructions to identify one or more words in a natural language query that have previously-established associations with stored data upon which the query will be executed, wherein the program instructions to identify the one or more words in the natural language query further comprise:
    program instructions to receive the natural language query, the natural language query being formatted to a query template, wherein the query template includes at least one first component and at least one second component, the first component including a pre-defined action, the second component being modifiable based, at least in part, on the one or more words;
    program instructions to determine at least one link between the one or more words in the natural language query and the at least one second component; and
  program instructions to modify the at least one second component of the query template based, at least in part, on the at least one link, wherein modifying the at least one second component includes adding to the query template a rule that limits possible values for the at least one second component and a name of a database table that includes the stored data upon which the query will be executed;
  program instructions to generate a new query by adding one or more values to the query template, wherein the one or more values are added to the query template based, at least in part, on the modification of the at least one second component of the query template and the one or more words in the natural language query; and
  program instructions to execute a search based on the new query.

11. The computer program product of claim 10, further comprising program instructions, stored on the one or more computer-readable tangible storage devices, to:
  prior to identifying the one or more words in the natural language query that have known previously-established associations with stored data upon which the query will be executed, provide a user a plurality of query templates; and
  receive, from the user, the query formed to one of the plurality of query templates.

12. The computer program product of claim 10, further comprising program instructions, stored on the one or more computer-readable tangible storage devices, to:
  prior to identifying the one or more words in the natural language query that have previously-established associations with stored data upon which the query will be executed, receive the natural language query from a mobile computing device; and
  subsequent to executing the new query, returning results to the mobile computing device from which the natural language query was received.

13. The computer program product of claim 10, wherein the at least one link between the one or more words in the natural language query and the at least one second component further comprises:
 a relationship of the one or more words in the natural language query with at least one of a definition, a rule, and a location of the at least one second component, wherein:
  the definition comprises an attribute in the query template that corresponds to stored data, and wherein a value for the attribute is associated with a database field of a database table;
  the rule includes one or more constraints that limit possible values for the attribute in the query, and wherein the rule includes one or both of structure and syntax of the query template; and
  the location comprises a name of the database table that corresponds with stored data upon which the query will be executed.

14. The computer program product of claim 10, wherein program instructions to determine, by operation of one or more computer processors, at least one link between the one or more words in the natural language query and the at least one second component further comprises:
 program instructions to locate the one or more words in the natural language query within a first glossary of terms, wherein the first glossary of terms comprises a list of the one or more words in the natural language query and the at least one link between the one or more words in the natural language query and the at least one second component; and
 responsive to program instructions to locate the one or more words in the natural language query within the first glossary of terms, program instructions to retrieve the at least one link between the one or more words in the natural language query and the at least one second component.

15. The computer program product of claim 14, wherein program instructions to generate a new query by adding one or more values to the query template further comprises:
 program instructions to locate the added one or more values within a second glossary of terms;
 responsive to program instructions to locate the added one or more values within the second glossary of terms, program instructions to retrieve a second one or more values related to the added one or more values; and
 program instructions to substitute the second one or more values into the query template for the modified at least one second component of the query template.

16. The computer program product of claim 10, wherein program instructions to modify, by operation of one or more computer processors, the at least one second component of the query template further comprises:
 program instructions to add a determined name of an attribute into the at least one second component of the query template, wherein the name of the attribute that is added indicates a database field of a database table.

17. The computer program product of claim 10, wherein program instructions to determine, by operation of one or more computer processors, at least one link between the one or more words in the natural language query and the at least one second component further comprises:
 program instructions to determine whether the one or more words in the natural language query is related to the at least one first component of the query template; and
 responsive to program instructions to determine that the one or more words in the natural language query is not related to the at least one first component of the query template, program instructions to determine whether the one or more words is related to the at least one second component of the query template.

18. The computer program product of claim 10, further comprising:
 prior to program instructions to identify the one or more words in the natural language query that have previously-established associations with stored data upon which the query will be executed:
  program instructions to receive a portion of text from at least one selected from a group consisting of: one or more audio signals converted to text, a text message from a mobile device, and text input from a user;
  program instructions to determine, by operation of one or more computer processors, whether the selection of text represents the natural language query;
  responsive to program instructions to determine that the selection of text represents the natural language query, program instructions to compare the selection of text to a plurality of query templates;
  program instructions to identify, by operation of one or more computer processors, one or more words in the selection of text that is at least defined as equivalent to the one or more words corresponding to one or more of the query templates from the plurality of query templates;
  program instructions to determine which query template corresponds to the highest number of matching or equivalent one or more words; and
  program instructions to format the selection of text to the determined query template.

19. A computer system for generating a query by modifying a query template, the computer system comprising:
 one or more computer processors;
 one or more computer-readable tangible storage devices;
 program instructions, stored on at least one of the one or more computer-readable tangible storage devices for execution by at least one of the one or more computer processors, the program instructions comprising:
 program instructions to identify one or more words in a natural language query that have previously-established associations with stored data upon which the query will be executed, wherein the program instructions to identify the one or more words in the natural language query further comprise:
  program instructions to receive the natural language query, the natural language query being formatted to a query template, wherein the query template includes at least one first component and at least one second component, the first component including a predefined action, the second component being modifiable based, at least in part, on the one or more words;
  program instructions to determine at least one link between the one or more words in the natural language query and the at least one second component; and
 program instructions to modify the at least one second component of the query template based, at least in part, on the at least one link, wherein modifying the at least one second component includes adding to the query template a rule that limits possible values for the at least one second component and a name of a database table that includes the stored data upon which the query will be executed;
 program instructions to generate a new query by adding one or more values to the query template, wherein the one or more values are added to the query template based, at least in part, on the modification of the at least one second component of the query template and the one or more words in the natural language query; and program instructions to execute a search based on the new query.

20. The computer system of claim 19, further comprising program instructions, stored on at least one of the one or more computer-readable tangible storage devices for execution by at least one of the one or more computer processors, to:

prior to identifying the one or more words in the natural language query that have previously-established associations with stored data upon which the query will be executed, provide a user a plurality of query templates; and receive, from the user, the query formed to one of the plurality of query templates.

21. The computer system of claim 19, further comprising program instructions, stored on at least one of the one or more computer-readable tangible storage devices for execution by at least one of the one or more computer processors, to:

prior to identifying the one or more words in the natural language query that have previously-established associations with stored data upon which the query will be executed, receive the natural language query from a mobile computing device; and subsequent to executing the new query, returning results to the mobile computing device from which the natural language query was received.

22. The computer system of claim 19, wherein the at least one link between the one or more words in the natural language query and the at least one second component further comprises:

a relationship of the one or more words in the natural language query with at least one of a definition, a rule, and a location of the at least one second component, wherein:

the definition comprises an attribute in the query template that corresponds to stored data, and wherein a value for the attribute is associated with a database field of a database table;

the rule includes one or more constraints that limit possible values for the attribute in the query, and wherein the rule includes one or both of structure and syntax of the query template; and the location comprises a name of the database table that corresponds with stored data upon which the query will be executed.

23. The computer system of claim 19, wherein program instructions to determine, by operation of one or more computer processors, at least one link between the one or more words in the natural language query and the at least one second component further comprises:

program instructions to locate the one or more words in the natural language query within a first glossary of terms, wherein the first glossary of terms comprises a list of the one or more words in the natural language query and the at least one link between the one or more words in the natural language query and the at least one second component; and responsive to program instructions to locate the one or more words in the natural language query within the first glossary of terms, program instructions to retrieve the at least one link between the one or more words in the natural language query and the at least one second component.

24. The computer system of claim 19, wherein program instructions to modify, by operation of one or more computer processors, the at least one second component of the query template further comprises:

program instructions to add a determined name of an attribute into the at least one second component of the query template, wherein the name of the attribute that is added indicates a database field of a database table.

25. The computer system of claim 19, wherein program instructions to determine, by operation of one or more computer processors, at least one link between the one or more words in the natural language query and the at least one second component further comprises:

program instructions to determine whether the one or more words in the natural language query is related to the at least one first component of the query template; and responsive to program instructions to determine that the one or more words in the natural language query is not related to the at least one first component of the query template, program instructions to determine whether the one or more words is related to the at least one second component of the query template.

\* \* \* \* \*